US011856020B2

(12) United States Patent
Mandrychenko

(10) Patent No.: US 11,856,020 B2
(45) Date of Patent: *Dec. 26, 2023

(54) DETECTING POTENTIAL DOMAIN NAME SYSTEM (DNS) HIJACKING BY IDENTIFYING ANOMALOUS CHANGES TO DNS RECORDS

(71) Applicant: Fortinet, Inc., Sunnyvale, CA (US)

(72) Inventor: Oleksii Mandrychenko, Edinburg (GB)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/726,220

(22) Filed: Apr. 21, 2022

(65) Prior Publication Data

US 2022/0247781 A1 Aug. 4, 2022

Related U.S. Application Data

(63) Continuation of application No. 16/572,813, filed on Sep. 17, 2019, now Pat. No. 11,343,275.

(51) Int. Cl.
*H04L 9/40* (2022.01)
*G06N 20/00* (2019.01)
*H04L 61/4511* (2022.01)

(52) U.S. Cl.
CPC ......... *H04L 63/1466* (2013.01); *G06N 20/00* (2019.01); *H04L 61/4511* (2022.05); *H04L 63/0876* (2013.01); *H04L 63/12* (2013.01); *H04L 63/1425* (2013.01); *H04L 63/1433* (2013.01); *H04L 63/1483* (2013.01); *H04L 63/20* (2013.01)

(58) Field of Classification Search
CPC ............ H04L 63/1466; H04L 61/1511; H04L 63/0876; H04L 63/12; H04L 63/1425; H04L 63/1433; H04L 63/1483; H04L 63/20; G06N 20/00

See application file for complete search history.

(56) References Cited

U.S. PATENT DOCUMENTS

| 10,362,057 | B1 * | 7/2019 | Wu ..................... H04L 63/1408 |
| 10,402,876 | B1 * | 9/2019 | Merdinger .......... H04L 61/4511 |
| 10,673,894 | B2 * | 6/2020 | Sjouwerman .......... G06N 20/00 |
| 10,862,907 | B1 * | 12/2020 | Pon ........................ G06F 16/955 |
| 10,958,662 | B1 * | 3/2021 | Sole ..................... H04L 63/0853 |
| 2017/0155678 | A1 * | 6/2017 | Araújo ................ H04L 63/1458 |

(Continued)

*Primary Examiner* — Stephen T Gundry
(74) *Attorney, Agent, or Firm* — Jaffery Watson; Mendonsa & Hamilton LLP

(57) ABSTRACT

Systems and methods are described for scanning or monitoring of Domain Name System (DNS) records of an entity for identifying anomalous changes to the DNS records that may be indicative of possible DNS hijacking. According to one embodiment, DNS monitoring engine running on a network security appliance protecting a private network, or implemented as a cloud-based service can be used for monitoring DNS records of the entity. Any modification in the monitored DNS record(s) can be detected within a pre-defined or configurable time-frame. The detected modification can be determined to be anomalous or not, by assigning a criticality value based on current value and previous value of one or more fields of the DNS record, one or more attributes of the DNS record and one or more derived attributes based on the DNS record.

33 Claims, 7 Drawing Sheets

(56) References Cited

U.S. PATENT DOCUMENTS

| | | | |
|---|---|---|---|
| 2019/0098049 A1* | 3/2019 | Lumezanu | G06N 3/0445 |
| 2020/0053129 A1* | 2/2020 | Neystadt | H04L 63/166 |
| 2020/0112574 A1* | 4/2020 | Koral | H04L 61/4511 |
| 2020/0137021 A1* | 4/2020 | Janakiraman | H04L 61/4511 |
| 2020/0137024 A1* | 4/2020 | Janakiraman | H04L 63/0236 |
| 2020/0137094 A1* | 4/2020 | Janakiraman | G06N 20/00 |
| 2020/0213277 A1* | 7/2020 | Rudnik | H04L 12/4641 |
| 2020/0244529 A1* | 7/2020 | Dehaine | H04L 61/4511 |
| 2020/0304544 A1* | 9/2020 | Vasanthapuram | G06F 16/953 |
| 2020/0351244 A1* | 11/2020 | Moore | H04L 63/20 |
| 2020/0409957 A1* | 12/2020 | Zhang | G06F 16/24561 |

* cited by examiner

DETECTING POTENTIAL DOMAIN NAME SYSTEM (DNS) HIJACKING BY IDENTIFYING ANOMALOUS CHANGES TO DNS RECORDS

RELATED APPLICATION

This application is a continuation of U.S. patent application Ser. No. 16/572,813, filed Sep. 17, 2019, and entitled "DETECTING POTENTIAL DOMAIN NAME SYSTEM (DNS) HIJACKING BY IDENTIFYING ANOMALOUS CHANGES TO DNS RECORDS" by Mandrychenko. The entirety of the aforementioned reference is incorporated herein by reference for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2019, Fortinet, Inc.

BACKGROUND

Field

Embodiments of the present disclosure generally relate to network security (cybersecurity) and mitigation of cyber threats. In particular, embodiments of the present disclosure relate to systems and methods for detecting anomalous changes in Domain Name System (DNS) records of an entity (e.g., public or private organizations, national security organizations, governmental agencies, and the like) by performing one or more types of DNS transactions from different locations all over the world to identify anomalous changes to DNS records that may be indicative of DNS hijacking.

Description of the Related Art

The Domain Name System (DNS) is one of the major fundamental systems that allows the Internet to run. DNS resolves the domain name of a uniform resource locator (URL) to a machine-routable Internet Protocol (IP) address. In this manner, end users of web clients (e.g., applications, such as web browsers and email clients, running on an end user device) can use human-friendly computer hostnames to interact with web resources (e.g., websites, web pages, network accessible documents, databases and files, email and web services). This simple, yet critical functionality provided by DNS is used daily by nearly all Internet and Intranet users, applications and servers. The role of DNS is paramount with many global, national and smaller organizations critically depending on this system. The importance of running this system in a secure and reliable fashion is difficult to overestimate.

In 2018-2019, a new sophisticated attack was discovered against the DNS that included an attacker gaining access to unencrypted network traffic to internal organizational traffic, performing credential extraction, issuance of valid Secure Sockets Layer (SSL) certificates, decryption of Virtual Private Network (VPN) traffic, and reading email among other nefarious activities. The severity of this type of attack prompted the US Department of Homeland Security to issue an emergency directive 19-01. This complex attack (referred to herein as DNS hijacking) relied on a single key aspect of the DNS system—the ability of authorized personnel to make changes to DNS entries. Using various means (e.g., exploiting known vulnerabilities of the network of the primary victim (domain name registrant) or sending spear-phishing emails), an attacker is able to obtain the registrant's credentials. Once the attacker has the registrant's credentials, the attacker can use them to login to the domain name registrar (e.g., Network Solutions, GoDaddy, and HostGator) from which the registrant acquired the domain name(s) at issue and can then change DNS entries for one or more domains associated with the victim from an original legitimate IP address to an IP address controlled by the attacker. This effectively allows the attacker to perform a man-in-the-middle (MITM) attack, including inspecting the traffic being directed to the attacker-controlled IP address and then redirecting it back to the original service so as to evade discovery. As DNS entries are infrequently checked, if ever, and all the systems continue to run as expected, some victims of this type of DNS hijacking attack may not become aware of it. Thereafter, when secondary victims attempt to access those websites whose IP addresses have been altered, their network traffic is at least temporarily directed to a malicious website (e.g., a fake website or a "spoofed" site that may imitate the legitimate website, for example, to collect credentials, account numbers or the like) controlled by the attacker. As such, there is a need for a technological solution that will help registrants proactively identify potential instances of DNS hijacking in relation to their domains.

SUMMARY

Systems and methods are described for scanning or monitoring of Domain Name System (DNS) records of an entity for identifying anomalous changes to the DNS records that may be indicative of possible DNS hijacking.

According to one embodiment, a DNS monitoring engine running on a computer system, monitors DNS records pertaining to one or more domains and subdomains by obtaining DNS results of an entity, which can be performed by causing multiple geographically distributed DNS system scanners to issue DNS queries for the one or more domains and subdomains to DNS servers from different geographical regions. The DNS monitoring engine can detect a modification of a DNS record from the obtained DNS results within a pre-defined and configurable time-frame. In response to detection of the modification of the DNS record, the DNS monitoring engine can determine whether the modification is anomalous by assigning a criticality value to the modification based on a current value and previous value of one or more fields, one or more attributes of the DNS record and one or more derived attributes based on the DNS record.

According to an embodiment, the one or more fields can include a name of a service associated with the DNS record or a destination Internet Protocol (IP) address. Further, the one or more attributes can include a time at which the modification was made or a record type of the DNS record. Furthermore, the one or more derived attributes can include a geolocation of the current value of the destination IP, a geolocation of the previous value of the destination IP, a name of the user that allegedly made the change, or metadata associated with the user, where the metadata associated with the user comprises any or a combination of a role of the user in the entity, an email address of the user, a first name of the user and a last name of the user. For purposes of assigning the criticality value, each of the one or more fields, the one or more attributes and the one or more derived attributes can be associated with a weight.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
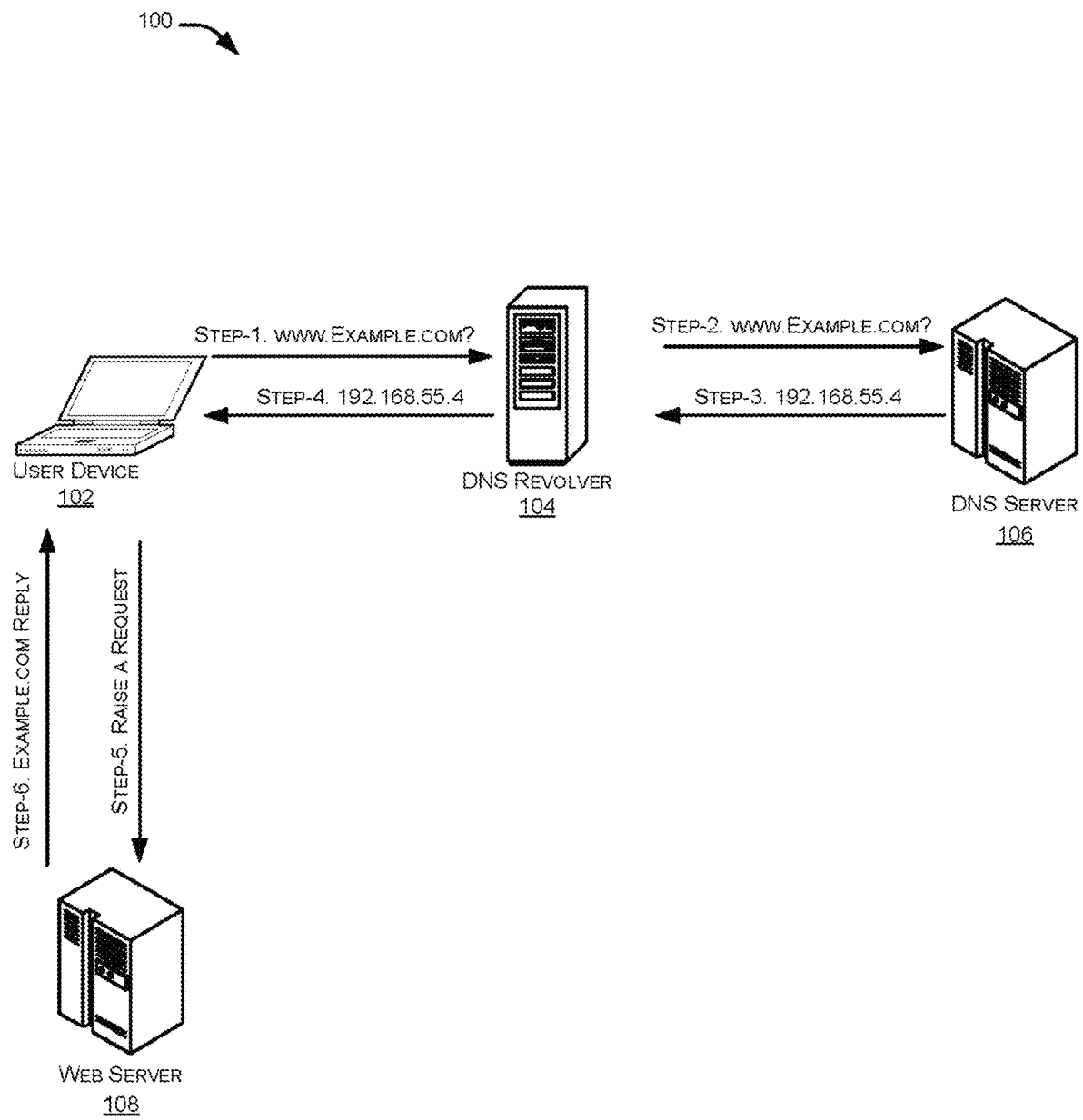
FIG. 1 illustrates a general process of performing Domain Name System (DNS) resolution.

Systems and methods are described for identifying anomalous changes to DNS records. In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but are not limited to, simple packet forwarding, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this invention will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

According to various embodiments of the present disclosure, a DNS monitoring engine running on a computer system, monitors DNS records pertaining to domains and subdomains by obtaining results of an entity from DNS servers for the domains and subdomains. The subdomains can be obtained using an enumeration technique that can include any or a combination of use of an Asynchronous Full Transfer Zone (AXFR) query, use of a keyword-based search for DNS records associated with the entity and obtaining a list of known DNS records associated with the entity. Further, the entity can include a user, a company, an individual, an organization, and the like. The DNS monitoring engine detects a modification of a DNS record from the obtained DNS results within a pre-defined and configurable time-frame. In response to detecting of the modification of the DNS record, the DNS monitoring engine can determine whether the modification is anomalous by assigning a criticality value to the modification based on a current value and previous value of fields that can indicate a name of a service associated with the DNS record or a destination Internet Protocol (IP) address; attributes that can indicate a time at which the modification was made or a record type of the DNS record; and derived attributes that can include a geolocation of the current value of the destination IP, a geolocation of the previous value of the destination IP, a name of the user that allegedly made the change, or metadata associated with the user. The metadata associated with the user can further include any or a combination of a role of the user in the entity, an email address of the user, a first name of the user and a last name of the user.

According to an embodiment, each of the fields, the attributes and the derived attributes can be associated with a weight for purposes of assigning the criticality value that can be based on inputting the current value and the previous value of fields of the DNS record, the attributes of the DNS record and the derived attributes to a machine learning algorithm implementing a decision tree. In an implementation, when the modification is determined to be anomalous, the DNS monitoring engine causes an alert to be sent to a network administrator of the entity.

FIG. 1 illustrates a general process 100 of performing Domain Name System (DNS) resolution. In context of exemplary DNS resolution process 100, at step 1, a query is issued by a user device 102, which can pertain to accessing a website of an entity that a user desires to access. For example, the user can enter a uniform resource locator (URL) of a web page that he/she desires to visit using a web browser running on user device 102. Now, in order to access the web page, the Internet Protocol (IP) address of the web page is required. However, as IP address of the web page is not easy to remember, as such the user generally enters a URL including a domain name, e.g. 'www.example.com' into an address bar of a web browser of user device 102. In response to receiving the domain name, the web browser of user device 102 can issue a query (a DNS query) to DNS resolver 104 to resolve or provide the IP address corresponding to 'www.example.com'. In response to the received query for the IP address of 'www.example.com', at step 2, DNS resolver 104 can request a DNS server 106 for the IP address of the domain name. At step 3, DNS server 106 resolves the corresponding IP address and can reply to DNS resolver 104 with IP address of domain address 'www.example.com' as '192.168.55.4'. Further, at step 4, the IP address from DNS resolver 104 is provided to the web browser of user device 102. In response to the received IP address, at step 5, the web browser application can now issue a request (an HTTP request) to web server 108. Further, at step 6, a response to the request from web server 108 is provided to web browser of user device 102.

Those skilled in the art will appreciate that in the context of an exemplary DNS hijacking attack (as described above), an attacker changes information on DNS server 106 so as to redirect traffic of a legitimate website to a fake website, for example. The attack aims at exploiting one or more DNS entries associated with an entity or an individual by changing or replacing the actual IP addresses associated with the legitimate websites with IP addresses of the fake websites. Now, when the user attempts to access the websites for which the IP addresses have been altered, he/she is directed to the fake website.

To provide additional clarity, the above-mentioned attack is explained by way of an example, for example, the IP address assigned to the URL "www.google.com" may be "172.217.167.46", and the IP address assigned to the URL "www.fortinet.com" may be "208.91.114.181". When a person wishes to visit the website of Google™, he/she may enter "www.google.com" into a URL field of a web browser on his/her user device 102. User device 102 then issues a DNS query to DNS server 106 through DNS resolver 104 for the IP address associated with the URL "www.google.com". DNS server 106 looks up the correct IP address for the URL "www.google.com" and returns the IP address "172.217.167.46" to user device 102 so that the web browser may contact "www.google.com" using the correct IP address. Now, if a hacker attempts to steal private information of various users, such as user names and passwords of bank accounts associated with a local bank with URL e.g., "www.local-bank.com". The hacker may set up a fake bank website, e.g., "www.fake-local-bank.com", having a homepage that mimics that of the real bank website, "www.local-bank.com". The IP address assigned to the real bank website may be "192.168.1.22", while the IP address associated with the fake bank website may be "186.45.2.8". To direct all the traffic from the real bank website to the fake bank website, the attacker may replace the real IP address, i.e., "192.168.1.22", for "www.local-bank.com" on DNS server 106 with the IP address of the fake bank website, i.e., "186.45.2.8". Thereafter, when user device 102 queries DNS server 106 through DNS resolver 104 for the IP address of web server 108 serving the website "www.local-bank.com", compromised DNS server 106 returns "186.45.2.8" instead, and user device 102 is directed to the application server hosting the fake bank website. In this manner, the unsuspecting users may be tricked into entering their user names and passwords on the fake bank website, which are then stolen by the criminal. Hence, the present disclosure provides a solution to detect and minimize such attacks caused by such alterations of DNS entries.

Figure 2:
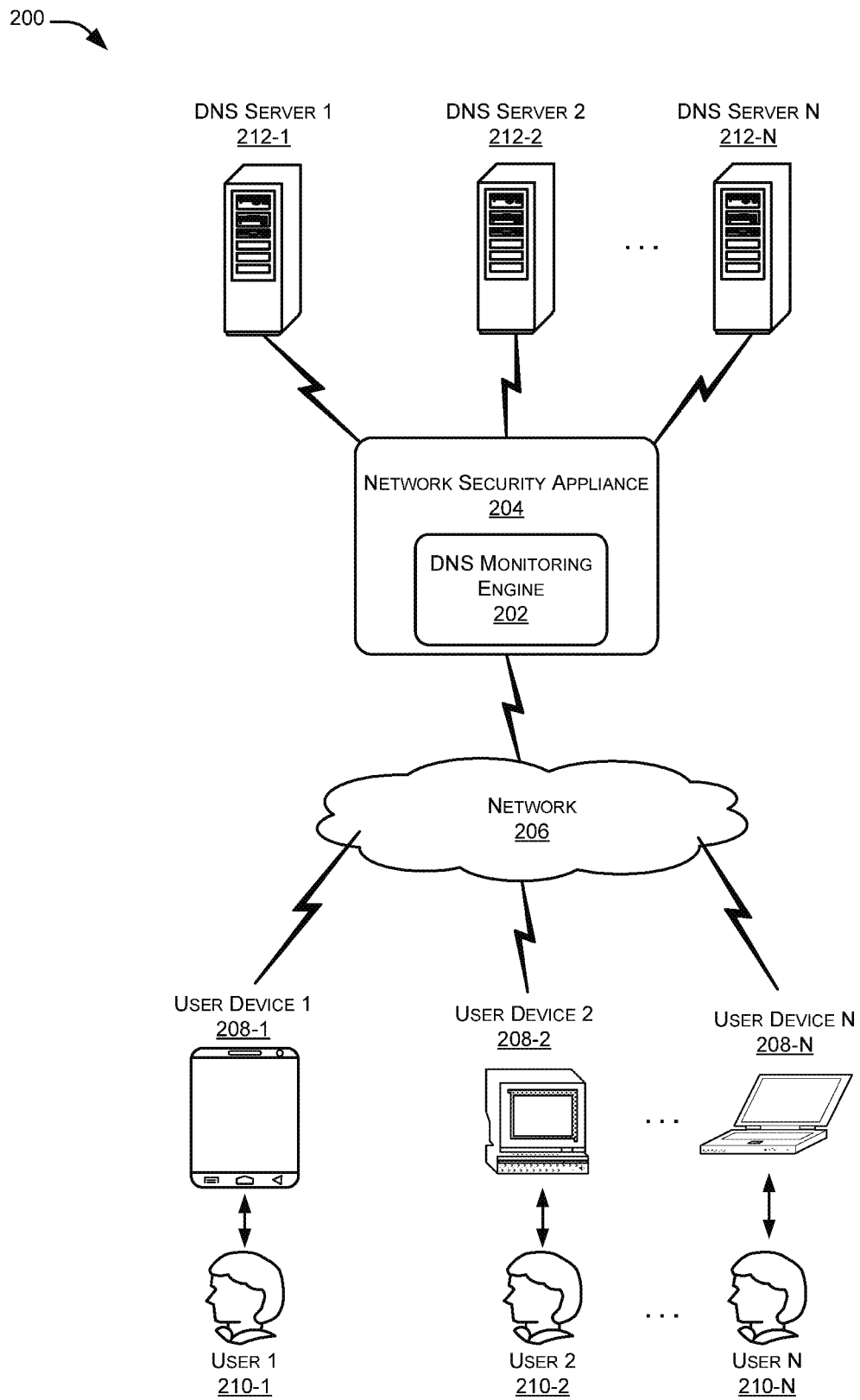
FIG. 2 illustrates a simplified network architecture in which aspects of the present invention can be implemented in accordance with an embodiment of the present invention.

FIG. 2 illustrates a simplified network architecture 200 in which aspects of the present invention can be implemented in accordance with an embodiment of the present invention. As illustrated, in a network implementation 200, DNS monitoring engine 202 can be incorporated within a network security appliance 204, protecting a private network. DNS monitoring engine 202 can be operatively coupled with multiple DNS servers 212-1, 212-2 . . . 212-N (which may be collectively referred to as DNS servers 212 and individually referred to as DNS server 212, hereinafter). Further, users 210-1, 210-2 . . . 210-N (which may be collectively referred to as users 210 and individually referred to as user 210, hereinafter) can interact with DNS servers 212 or DNS monitoring engine 202 using their respective user devices 208-1, 208-2 . . . 208-N (which may be collectively referred to as user devices 208 and individually referred to as user device 208, hereinafter) using a network 206. User devices 210 may include, but are not limited to, personal computers, smart devices, web-enabled devices, hand-held devices, laptops, mobile phones and the like, to enable interaction with network 206.

Those skilled in the art will appreciate that, network 206 can be wireless network, wired network or a combination thereof that can be implemented as one of the different types of networks, such as Intranet, Local Area Network (LAN), Wide Area Network (WAN), Internet, and the like. Further, network 206 can either be dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like.

Alternately, DNS monitoring engine 202 can be implemented on a server as part of a cloud-based service that can be provisioned and accessed through a cloud computing provider, external to the private network or any suitable network or computing device operatively coupled with network 206. Such a cloud service can be delivered over network 206 to monitor DNS records for domains and subdomains for identifying anomalous changes in DNS servers. In an implementation, DNS records of an entity can be monitored globally via geographically distributed DNS system scanners, which can be replicated/distributed at various locations to facilitate scanning of DNS records of the entity at the various locations for identification of any possible changes. Further, the DNS records from various locations can be compared to facilitate determination of anomalous changes.

According to an aspect, DNS monitoring engine 202 can be implemented in a computing device for monitoring multiple DNS records of various domains and subdomains of an entity by obtaining DNS results from DNS servers 212. The subdomains can be obtained using enumeration techniques e.g. Asynchronous Full Transfer Zone (AXFR) query, use of a keyword-based search for DNS records associated with the entity and obtaining a list of known DNS records associated with the entity. In an implementation, the DNS results can be obtained by causing multiple geographically distributed DNS system scanners to issue DNS queries for the domains and subdomains to DNS servers 212 from different geographical regions.

Further, DNS monitoring engine 202 can detect any modifications made in the DNS records from the obtained DNS results in a predefined or configurable time-frame according to requirements. DNS monitoring engine 202 can also determine whether the modification is anomalous by assigning a criticality value to the modification based on a current value and previous value of fields including a name of a service associated with the DNS record or a destination Internet Protocol (IP) address. The criticality value can further be based on attributes indicative of a time at which the modification was made or a record type of the DNS record, and derived attributes including but not limited to a geolocation of the current value of the destination IP, a geolocation of the previous value of the destination IP, a name of the user that allegedly made the change, or metadata associated with the user. In an example, the metadata associated with the user includes any or a combination of a role of the user in the entity, an email address of the user, a first name of the user a last name of the user and the like.

Also, various fields, attributes and derived attributes can be associated with a weight for purposes of assigning the criticality value. Assigning of the criticality value can be performed by inputting the current value and the previous value of the fields of the DNS records, the attributes of the DNS record and the derived attributes to a machine learning algorithm implementing a decision tree. Further, when DNS monitoring engine 202 determines the modification to be anomalous, an alert can be sent to a network administrator of the entity. For example, the alert can be sent as an as an email, via a text messaging service (e.g., Short Messaging System (SMS) text), a call or other notification mechanism to the network administrator.

In an embodiment, a user interface (UI) can be provided to user device 208 of the entity that can be termed as a conduit between human and computer interaction. The purpose of a UI is to enable a user to effectively control a computer or machine they are interacting with, and for feedback to be received in order to communicate effective completion of tasks. The UI can be the space where a user can interact with a user device 208 to perform tasks such as requesting DNS scanning, receive results of DNS scanning, receive an alert pertaining to anomalous modification and the like.

Therefore, in view of the above, those skilled in the art would appreciate that embodiments of the present disclosure allow periodic monitoring and auditing of global DNS entries to identify modifications. If a modification is detected, the modification can be logged and assessed for criticality. Using machine learning algorithms, for example decision trees, DNS monitoring engine 202 can determine if the modification was intentional or malicious. When the DNS modification is determined to non-anomalous (e.g., consistent with typical behavior of the enterprise), it can be simply stored in a database and presented to the network administrator along with other changes. When the modification is determined to be anomalous (e.g., deviates from normal behavior of the enterprise and therefore potentially malicious) then the network administrator or any other authorized person can be promptly notified.

Further, those skilled in the art will appreciate that although embodiments of the present disclosure are explained with reference to DNS records, various similar embodiments can be utilized for monitoring certificate transparency logs (CTLs), which can fix several issues with current Sockets Layer (SSL)/Transport Layer Security (TLS) infrastructure. DNS monitoring engine 202 can therefore be used to find a mistakenly issued SSL certificate, locate instances of stolen certificates, or identify a rogue certificate authority (CA). It will be appreciated that monitoring of CTLs can be part of the functionality of DNS monitoring engine 202 or can be performed independently by a separate cloud computing component implementing an internal system solely responsible for providing monitoring of CTLs, whose one instance can be shared by all user devices 208. However, to provide ease of explanation, monitoring of CTLs is explained using DNS monitoring engine 202.

According to an embodiment, DNS monitoring engine 202 can monitor CTLs within a pre-defined or configurable time-frame, for example, to provide a balance between resource utilization and delay in obtaining the most current information, the DNS monitoring engine 202 can monitor CTLs periodically say, at least once a day. DNS monitoring engine can use a staged approach by firstly running a lifetime query monitoring and investigating all previously issued certificates and then detecting modifications to the issued certificates.

In an implementation, to monitor CTLs, DNS monitoring engine 202 can include an application programming interface (API) façade, which defines an API for querying of CTL or subscribing to notifications for CTL modifications. An input to the API facade can be a domain name, such as "www.abcorganization.com" and an output of can be a list of details about the certificates issued for the domain or any associated sub-domains. DNS monitoring engine 202 can also be operatively coupled to a database containing information about the internal plumbing, which can store subscriber details and the state of subscriptions, API keys, request throttling, authentication data, requests logging, and other information not directly related to the CTLs. The database can either be a local database containing a copy of CTLs that is maintained and synced with the latest changes from other CTL providers or the database can be associated with a service that can be queried for data.

In an implementation, when user 210 wants to monitor "www.abcorganization.com" for publicly issued certificates, user device 208 can issue a request to API façade by providing domain name "www.abcorganization.com". API facade can query a locally maintained and updated database or a secure service and can return a set of records associated with domains and subdomains of "www.abcorganization.com". Alternately, when user 210 wants to monitor "www.abcorganization.com" for new publicly issued certificate, user device 208 can issue a request to API facade, providing "www.abcorganization.com" as an input and indicating that a subscription notification is required to be created so that the API facade can create a notification record in an internal database. DNS monitoring engine 202 can retrieve current subscription details (domain and/or subdomains along with last detected modification) and can query database or service for new data. When no new certificates are detected DNA monitoring engine 202 can progress to the next subscription for querying. When a new certificate is detected, DNS monitoring engine 202 can update the internal database about the certificate and call a notification service. Depending on the configuration of DNS monitoring engine 202, the notification service may send an email, chat notification, a text message or run some other pre-configured job or action indicating the modification. Also, using machine learning algorithms, DNS monitoring engine 202 can determine anomalous associations of the new data and can notify the network administrator accordingly.

Figure 3:
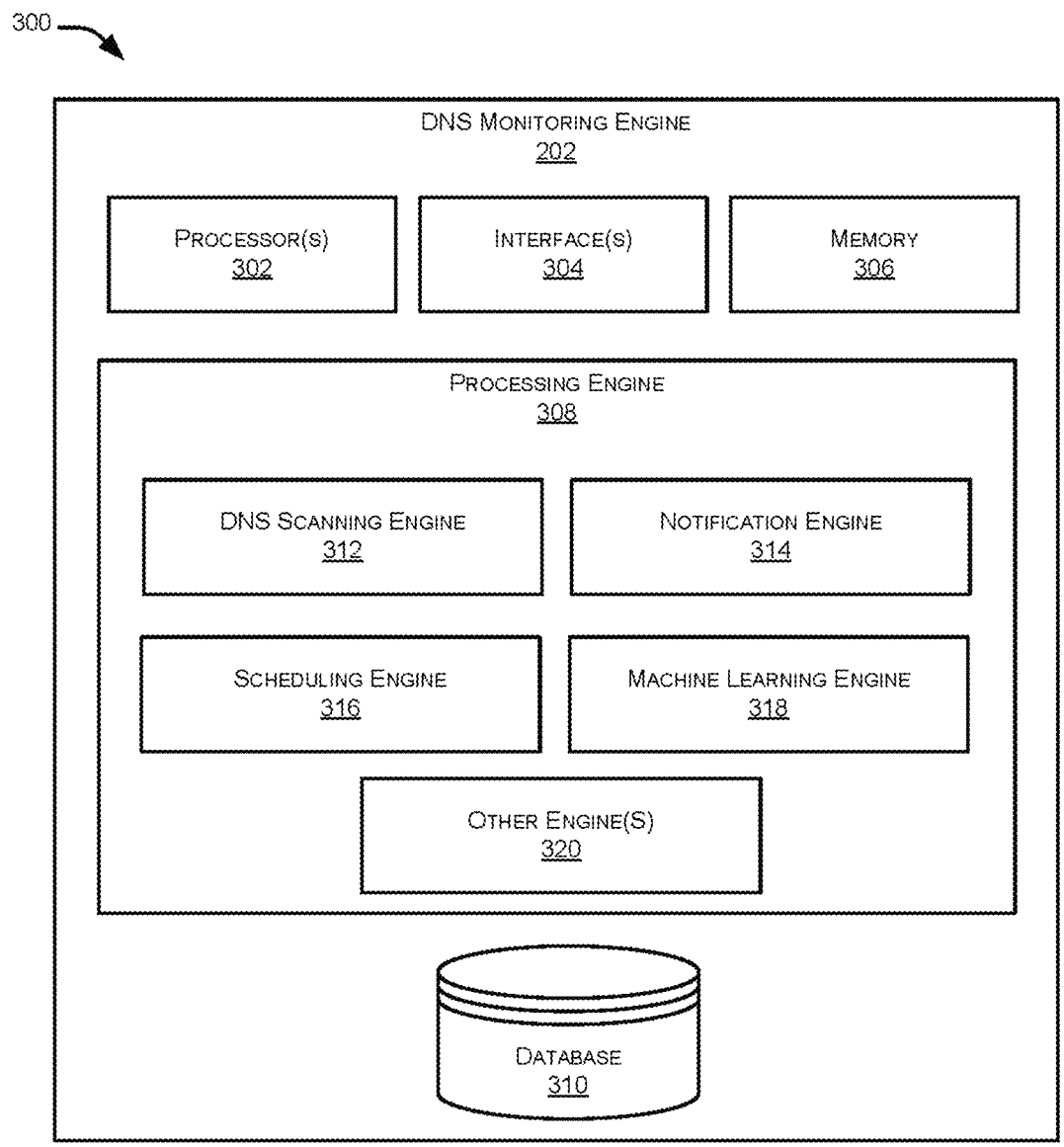
FIG. 3 illustrates exemplary functional components of a DNS monitoring engine in accordance with an embodiment of the present invention.

FIG. 3 illustrates exemplary functional components of a DNS monitoring engine 202 in accordance with an embodiment of the present invention. As illustrated, DNS monitoring engine 202 can include one or more processor(s) 302. Processor(s) 302 can be implemented as one or more microprocessors, microcomputers, microcontrollers, digital signal processors, central processing units, logic circuitries, and/or any devices that manipulate data based on operational instructions. Among other capabilities, processor(s) 302 are configured to fetch and execute computer-readable instructions stored in a memory 306 of DNS monitoring engine 202. Memory 306 can store one or more computer-readable instructions or routines, which may be fetched and executed to create or share the data units over a network service. Memory 306 can include any non-transitory storage device including, for example, volatile memory such as RAM, or non-volatile memory such as EPROM, flash memory, and the like. In an example embodiment, Memory 306 may be a local memory or may be located remotely, such as a server, a file server, a data server, and the cloud.

DNS monitoring engine 202 can also include one or more interface(s) 304. Interface(s) 304 may include a variety of interfaces, for example, interfaces for data input and output devices, referred to as I/O devices, storage devices, and the like. Interface(s) 304 may facilitate communication of DNS monitoring engine 202 with various devices coupled to DNS monitoring engine 202. Interface(s) 304 may also provide a communication pathway for one or more components of DNS monitoring engine 202. Examples of such components include, but are not limited to, processing engine(s) 308 and database 310.

Processing engine(s) 308 can be implemented as a combination of hardware and software or firmware programming (for example, programmable instructions) to implement one or more functionalities of engine(s) 308. In the examples described herein, such combinations of hardware and software or firmware programming may be implemented in several different ways. For example, the programming for the engine(s) may be processor executable instructions stored on a non-transitory machine-readable storage medium and the hardware for engine(s) 308 may include a processing resource (for example, one or more processors), to execute such instructions. In the examples, the machine-readable storage medium may store instructions that, when executed by the processing resource, implement engine(s) 308. In such examples, DNS monitoring engine 202 can include the machine-readable storage medium storing the instructions and the processing resource to execute the instructions, or the machine-readable storage medium may be separate but accessible to DNS monitoring engine 202 and the processing resource. In other examples, processing engine(s) 308 may be implemented by electronic circuitry. Database 310 can include data that is either stored or generated as a result of functionalities implemented by any of the components of processing engine(s) 308.

In an example, processing engine(s) 308 can include a DNS scanning engine 312, a notification engine 314, a scheduling engine 316, a machine learning engine 318 and other engine(s) 320. Other engine(s) 320 can implement functionalities that supplement applications or functions performed by DNS monitoring engine 202 or processing engine(s) 308.

In an embodiment, a DNS scanning engine 312 can be used for scanning the DNS servers for obtaining DNS results, which can pertain to DNS records of various domains and subdomains of an entity. The entity can include a user, an individual, a company, an organization and the like. In an implementation, DNS scanning engine 312 can be used for retrieving various subdomains of the domain associated with the entity by using an enumeration technique including the use of an AXFR query, use of a keyword-based search for DNS records associated with the entity and obtaining a list of known DNS records associated with the entity. In an embodiment, the DNS records from the various locations can be compared for determination of anomalous changes.

Though embodiments of the present disclosure are explained considering DNS scanning engine as a part of DNS monitoring engine, however, this does not limit the scope of the invention in any manner. Those skilled in the art will appreciate that DNS scanning engine 312 can be coupled with DNS system scanners, which can be replicated/distributed at various locations of the world to facilitate scanning of DNS records of the entity at the various locations. Scanning various DNS records worldwide further facilitates identification of any possible anomalous changes that might impact only a certain geographic region. In an example, the obtained DNS records can be associated with the location of the DNS system scanner that is scanning for DNS records to help determine location that is being hijacked.

In an embodiment, notification engine 314 can be configured to detect any modifications made in the DNS records from the obtained DNS results. The detection can be implemented for a predefined or configurable time-frame. If the modification is detected to be anomalous, notification engine 314 can generate an alert to a network administrator of the entity. The generated alert can be sent to the network administrator specific to location for which the modification is determined to be anomalous. In an implementation, the generated alert can be any or a combination of a visual and an audio alert, which can be sent to a user or administrator device in form of a text, a call or a notification.

According to an embodiment, database 310 can be used for storing information associated with various entities such as their domains; subdomains; DNS records; DNS modification with associated time, date and location information; information of the user who made the modification, and the like. In case if the modification to DNS is determined to be anomalous, then the modified information can be stored on database 310 with associated time, date and location information; information of the user who made the modification and the like.

According to an embodiment, scheduling engine 316 can be used for controlling and scheduling of the DNS system scanners through DNS scanning engine 312. The scheduling engine 316 can be configured for scheduling scanning of the DNS records of the DNS servers. Scheduling or controlling of triggering of DNS system scanners can facilitate maintaining of low load on the DNS servers. The scheduling engine 316 can be used for triggering the scanning of the DNS records by the DNS system scanner after a predefined time period. Alternately, the time period can be configurable as per requirements of the entity.

According to an embodiment, machine learning engine 318 can be configured to assign a criticality value to the detected modification to determine whether the modification is anomalous or not. The criticality value can be assigned based on a current value and previous value of fields including the name of a service associated with the DNS record or a destination Internet Protocol (IP) address. The criticality value can be further based on attributes indicative of a time at which the modification was made or a record type of the DNS record. The criticality value can be also based on derived attributes including but not limited to a geolocation of the current value of the destination IP, a geolocation of the previous value of the destination IP, a name of the user that allegedly made the change, or metadata associated with the user indicating a role of the user in the entity, an email address of the user, a first name of the user and a last name of the user.

In an implementation, the fields, the attributes and the derived attributes can be associated with suitable weights for purpose of assigning the criticality value. In another implementation, the criticality value to the modification can be assigned by inputting the current value and the previous value of the fields, the attributes and the derived attributes to a machine learning algorithm implementing a decision tree for identifying modifications specific to the entity. For example, if the entity is an organization that generally alters the DNS records very frequently, then using the decision tree, the identified modifications can be assigned low weightage to avoid false triggering of an alert.

Figure 4A:
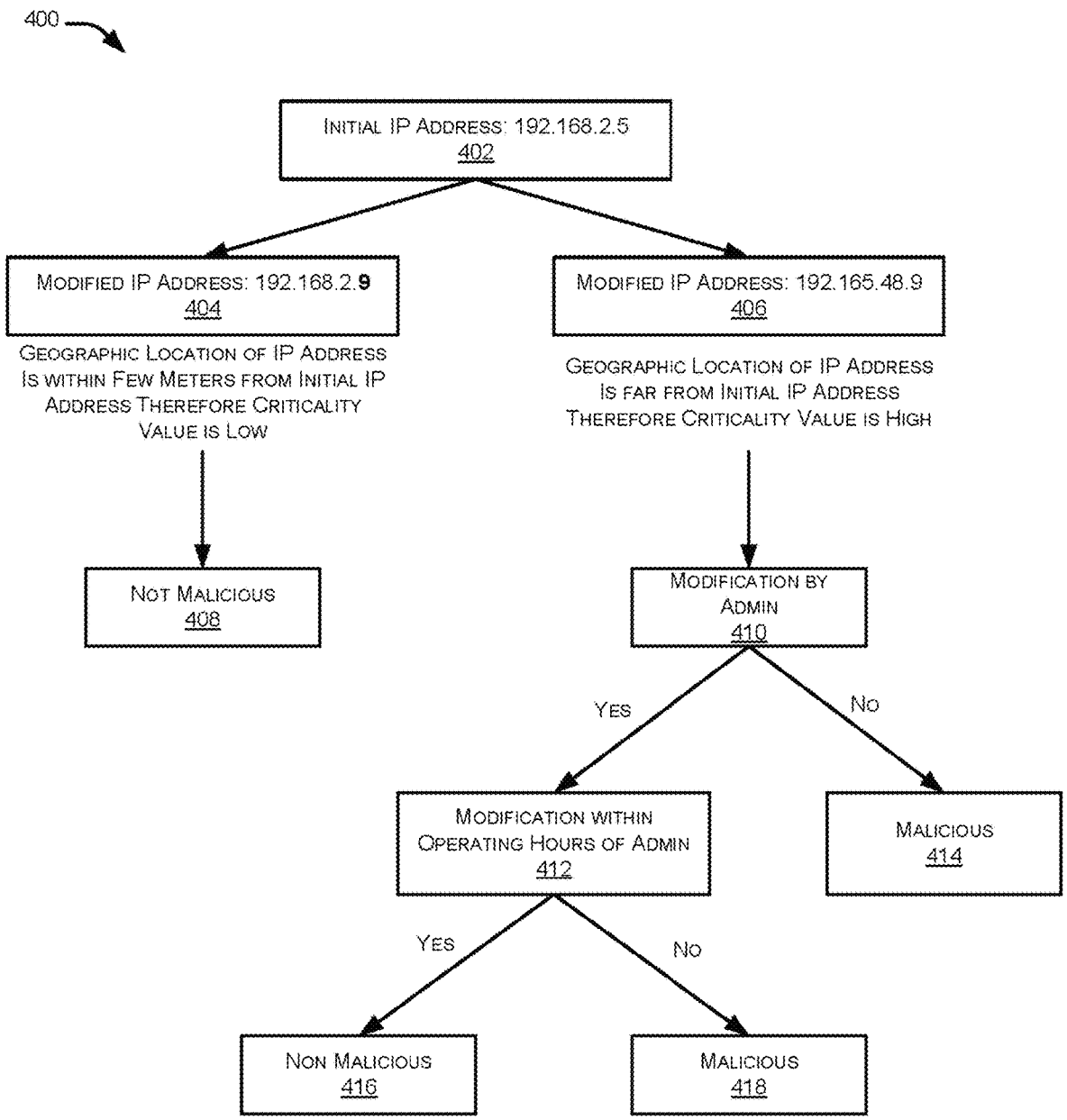
FIG. 4A illustrates a simplified decision tree in accordance with an embodiment of the present invention.

FIG. 4A illustrates a simplified decision tree 400 in accordance with an embodiment of the present invention.

In context of the present example, at block 402 an initial IP address of DNS server that can be '192.168.2.5' is analyzed. As denoted by block 404, if the IP address of the DNS server is modified and the modified IP address is '192.168.2.9', the initial IP address and modified IP address are fairly similar and also the geographic location of the modified IP address is within a few meters of the initial IP address. Therefore, this modification can be assigned low criticality value and thus the modifications may be identified as not malicious as denoted by block 408.

Further, if the modified IP address as represented by block 406 is '192.165.48.9', there is an enormous difference between the initial IP address and the modified IP address. Also, the geographic location of the IP address of the DNS server is far from the modified IP address, therefore, the criticality value may be high for such a modification. Now, at block 410, it may be checked whether the modification operation was performed by the administrator or not. If modification is not performed by the administrator, then as represented by block 414, it is highly likely that such modification is malicious or anomalous.

Alternately, if the modification is performed by the administrator, then at block 412, it may be further checked whether the modification was within operating hours of the administrator. If the modification is within operating hours of the administrator, then at block 416, it is highly likely that that the modification is not malicious. However, if the modification is not within operating hours of the administrator, then at block 418, it is highly likely that the modification is malicious.

Figure 4B:
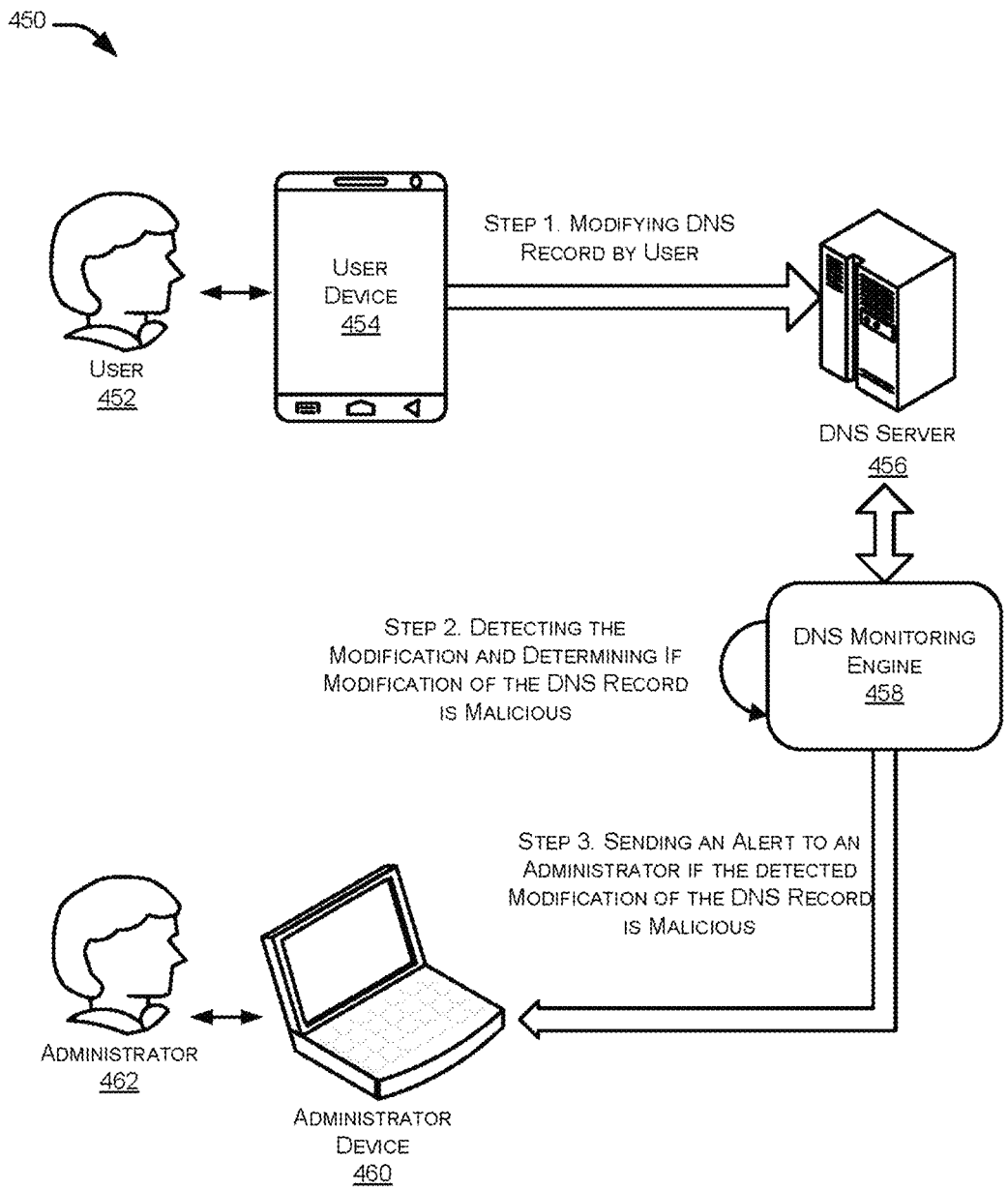
FIG. 4B is a high-level block diagram conceptually illustrating various interactions in accordance with an embodiment of the present invention.

FIG. 4B is a high-level block diagram 450 conceptually illustrating various interactions in accordance with an embodiment of the present invention.

In context of the present example 450, at step 1, a user 452 using his/her user device 454 modifies one or more DNS records associated with DNS server 456. Now, DNS monitoring engine 458 can scan DNS records of DNS server 456 periodically after a predefined time-period. Further, at step 2, DNS monitoring engine 458 can detect if any modifications have been made to the DNS records so that if the modification is detected, it can be determined whether the modification is malicious or not. DNS monitoring engine 458 can generate an alert if the modification is determined to be malicious. At step 3, the generated alert can be transmitted to administrator device 460 associated with an administrator 462. Thus, any anomalous or malicious modifications to DNS server 456 can be detected or identified and administrator 462 can be alerted to minimize the damage.

Figure 5:
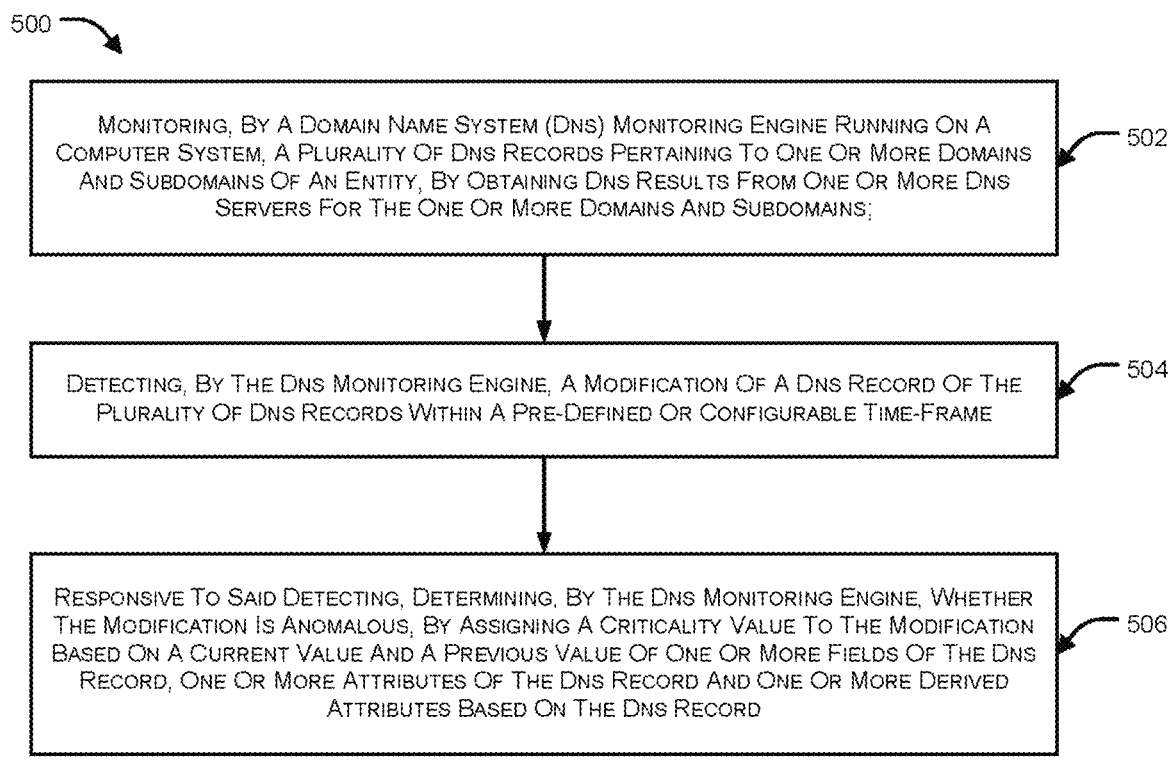
FIG. 5 is a flow diagram illustrating a process for determining whether a modification to a DNS record appears to be anomalous in accordance with an embodiment of the present invention.

FIG. 5 is a flow diagram 500 illustrating a process for determining whether a modification to a DNS record appears to be anomalous in accordance with an embodiment of the present invention.

In context of flow diagram 500, at block 502, a DNS monitoring engine running on a computer system monitors a plurality of DNS records pertaining to one or more domains and subdomains of an entity by obtaining DNS results from one or more DNS servers for the one or more domains and subdomains. At block 504, the DNS monitoring engine detects a modification of a DNS record from multiple DNS records of the entity that can be obtained within a pre-defined or a configurable time frame. In response to the detected modification of the DNS records, at block 506, to the DNS monitoring engine determines whether the determined modification is anomalous or not by assigning a criticality value to the determined modification based on current value and previous value of one or more fields of the DNS record, one or more attributes of the DNS record and one or more derived attributes based on the DNS record.

Figure 6:
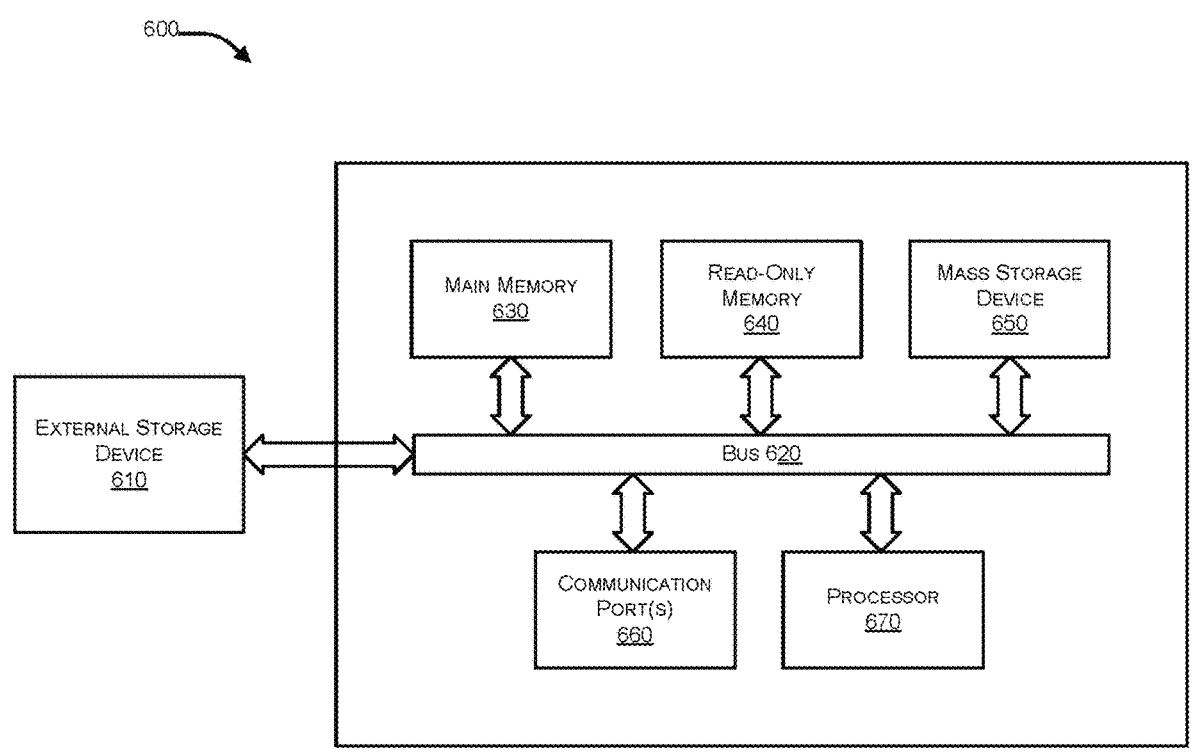
FIG. 6 illustrates an exemplary computer system in which or with which embodiments of the present invention may be utilized.

FIG. 6 illustrates an exemplary computer system in which or with which embodiments of the present invention may be utilized.

As shown in FIG. 6, computer system includes an external storage device 610, a bus 620, a main memory 630, a read only memory 640, a mass storage device 650, a communication port 660, and a processor 670. Computer system may represent some portion of DNS monitoring engine 202 or network security appliance 204.

Those skilled in the art will appreciate that computer system 600 may include more than one processor 670 and communication ports 660. Examples of processor 670 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 670 may include various modules associated with embodiments of the present invention.

Communication port 660 can be any of an RS-232 port for use with a modem-based dialup connection, a 10/100 Ethernet port, a Gigabit or 10 Gigabit port using copper or fiber, a serial port, a parallel port, or other existing or future ports. Communication port 660 may be chosen depending on a network, such a Local Area Network (LAN), Wide Area Network (WAN), or any network to which computer system connects.

Memory 630 can be Random Access Memory (RAM), or any other dynamic storage device commonly known in the art. Read only memory 640 can be any static storage device(s) e.g., but not limited to, a Programmable Read Only Memory (PROM) chips for storing static information e.g. start-up or BIOS instructions for processor 670.

Mass storage 650 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 620 communicatively couples processor(s) 670 with the other memory, storage and communication blocks. Bus 620 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 670 to software system.

Optionally, operator and administrative interfaces, e.g. a display, keyboard, and a cursor control device, may also be coupled to bus 620 to support direct operator interaction with computer system. Other operator and administrative interfaces can be provided through network connections connected through communication port 660. External storage device 610 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

Thus, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

What is claimed is:

1. A non-transitory computer-readable storage medium embodying a set of instructions, which when executed by one or more processors of a computer system, causes the one or more processors to perform a method comprising:
    monitoring, by a processing device, a plurality of Domain Name System (DNS) records pertaining to at least one domain or subdomain of an entity;
    detecting, by the processing device, a modification of a DNS record of the plurality of DNS records within a defined time-frame; and
    responsive to said detecting, determining, by the processing device, whether the modification is anomalous, by assigning a criticality value to the modification, wherein the criticality value is based on a combination of a current value and a previous value of one or more fields of the DNS record, and at least one of: an attribute of the DNS record, and a derived attribute based on the DNS record.

2. The non-transitory computer-readable storage medium of claim 1, wherein the DNS results are obtained from one or more DNS servers for the at least one domain or subdomain by causing a plurality of geographically distributed DNS system scanners to issue DNS queries for the one or more domains and subdomains to a plurality of DNS servers from different geographical regions.

3. The non-transitory computer-readable storage medium of claim 1, wherein the one or more fields of the DNS record are indicative of a name of a service associated with the DNS record or a destination Internet Protocol (IP) address.

4. The non-transitory computer-readable storage medium of claim 3, wherein the attribute of the DNS record is indicative of a time at which the modification was made or a record type of the DNS record.

5. The non-transitory computer-readable storage medium of claim 4, wherein the derived attribute includes a data selected from a group consisting of: a geolocation of the current value of the destination IP, a geolocation of the previous value of the destination IP, a name of the user that allegedly made the change, and a metadata associated with the user.

6. The non-transitory computer-readable storage medium of claim 5, wherein the metadata associated with the user comprises any or a combination of: a role of the user in the entity, an email address of the user, a first name of the user and a last name of the user.

7. The non-transitory computer-readable storage medium of claim 1, wherein each of the one or more fields of the DNS record, the attribute of the DNS record, and the derived attribute of the DNS record is associated with a weight for purposes of assigning the criticality value.

8. The non-transitory computer-readable storage medium of claim 1, the method further comprising:
    when the modification is determined to be anomalous, causing, by the processing device, an alert to be sent to a network administrator of the entity.

9. The non-transitory computer-readable storage medium of claim 1, wherein the assigning the criticality value to the modification comprises:
    inputting of two or more of: the current value and the previous value of the one or more fields of the DNS record, the attribute of the DNS record, and the derived attribute of the DNS record to a machine learning algorithm implementing a decision tree.

10. The non-transitory computer-readable storage medium of claim 1, wherein the subdomain is obtained using an enumeration technique.

11. The non-transitory computer-readable storage medium of claim 10, wherein the enumeration technique comprises any or a combination of use of an Asynchronous Full Transfer Zone (AXFR) query, use of a keyword-based search for DNS records associated with the entity and obtaining a list of known DNS records associated with the entity.

12. A method comprising:
monitoring, by a processing device, a plurality of Domain Name System (DNS) records pertaining to at least one domain or subdomain of an entity;
detecting, by the processing device, a modification of a DNS record of the plurality of DNS records within a defined time-frame; and
responsive to said detecting, determining, by the processing device, whether the modification is anomalous, by assigning a criticality value to the modification, wherein the criticality value is based on a combination of a current value and a previous value of one or more fields of the DNS record, and at least one of: an attribute of the DNS record, and a derived attribute based on the DNS record.

13. The method of claim 12, wherein the DNS results are obtained from one or more DNS servers for the at least one domain or subdomain by causing a plurality of geographically distributed DNS system scanners to issue DNS queries for the one or more domains and subdomains to a plurality of DNS servers from different geographical regions.

14. The method of claim 12, wherein the one or more fields of the DNS record are indicative of a name of a service associated with the DNS record or a destination Internet Protocol (IP) address.

15. The method of claim 14, wherein the attribute of the DNS record is indicative of a time at which the modification was made or a record type of the DNS record.

16. The method of claim 15, wherein the derived attribute includes a data selected from a group consisting of: a geolocation of the current value of the destination IP, a geolocation of the previous value of the destination IP, a name of the user that allegedly made the change, and a metadata associated with the user.

17. The method of claim 16, wherein the metadata associated with the user comprises any or a combination of: a role of the user in the entity, an email address of the user, a first name of the user and a last name of the user.

18. The method of claim 15, wherein each of the one or more fields of the DNS record, the attribute of the DNS record, and the derived attribute of the DNS record is associated with a weight for purposes of assigning the criticality value.

19. The method of claim 15, the method further comprising:
when the modification is determined to be anomalous, causing, by the processing device, an alert to be sent to a network administrator of the entity.

20. The method of claim 15, wherein said assigning a criticality value to the modification comprises:
inputting of two or more of: the current value and the previous value of the one or more fields of the DNS record, the attribute of the DNS record, and the derived attribute of the DNS record to a machine learning algorithm implementing a decision tree.

21. The method of claim 15, wherein the subdomain is obtained using an enumeration technique.

22. The method of claim 21, wherein the enumeration technique comprises any or a combination of use of an Asynchronous Full Transfer Zone (AXFR) query, use of a keyword-based search for DNS records associated with the entity and obtaining a list of known DNS records associated with the entity.

23. A system, the system comprising:
a processing resource of a computer system; and
a non-transitory computer-readable storage medium coupled to the processing resource, wherein the non-transitory computer-readable storage medium embodies a set of instructions, which when executed by the processing resource of a computer system, causes the one or more processors to perform a method comprising:
monitoring a plurality of Domain Name System (DNS) records pertaining to at least one domain or subdomain of an entity;
detecting a modification of a DNS record of the plurality of DNS records within a defined time-frame; and
responsive to said detecting, determining whether the modification is anomalous, by assigning a criticality value to the modification, wherein the criticality value is based on a combination of a current value and a previous value of one or more fields of the DNS record, and at least one of: an attribute of the DNS record, a derived attribute based on the DNS record.

24. The system of claim 23, wherein the DNS results are obtained from one or more DNS servers for the at least one domain or subdomain by causing a plurality of geographically distributed DNS system scanners to issue DNS queries for the one or more domains and subdomains to a plurality of DNS servers from different geographical regions.

25. The system of claim 23, wherein the one or more fields of the DNS record are indicative of a name of a service associated with the DNS record or a destination Internet Protocol (IP) address.

26. The system of claim 25, wherein the attribute of the DNS record is indicative of a time at which the modification was made or a record type of the DNS record.

27. The system of claim 26, wherein the derived attribute includes a data selected from a group consisting of: a geolocation of the current value of the destination IP, a geolocation of the previous value of the destination IP, a name of the user that allegedly made the change, and a metadata associated with the user.

28. The system of claim 27, wherein the metadata associated with the user comprises any or a combination of: a role of the user in the entity, an email address of the user, a first name of the user and a last name of the user.

29. The system of claim 23, wherein each of the one or more fields of the DNS record, the attribute of the DNS record, and the derived attribute of the DNS record is associated with a weight for purposes of assigning the criticality value.

30. The system of claim 23, wherein the non-transitory computer-readable storage medium further embodies a set of instructions, which when executed by the processing resource of the computer system, causes the one or more processors to perform a method comprising:
when the modification is determined to be anomalous, causing, by the processing device, an alert to be sent to a network administrator of the entity.

31. The system of claim 23, wherein the assigning the criticality value to the modification comprises:
inputting of two or more of: the current value and the previous value of the one or more fields of the DNS record, the attribute of the DNS record, and the derived attribute of the DNS record to a machine learning algorithm implementing a decision tree.

32. The system of claim 23, wherein the subdomain is obtained using an enumeration technique.

33. The system of claim 32, wherein the enumeration technique comprises any or a combination of use of an Asynchronous Full Transfer Zone (AXFR) query, use of a keyword-based search for DNS records associated with the entity and obtaining a list of known DNS records associated with the entity.

\* \* \* \* \*